United States Patent Office 2,978,450
Patented Apr. 4, 1961

2,978,450
PRODUCTION OF VINYL COMPOUNDS

Walter Reppe, Heidelberg, and Matthias Seefelder, Ludwigshafen (Rhine), Oppau, Germany, assignors to Badische Anilin- & Soda-Fabrik Aktiengesellschaft, Ludwigshafen (Rhine), Germany No Drawing. Filed Sept. 4, 1957, Ser. No. 681,880

Claims priority, application Germany Sept. 11, 1956

11 Claims. (Cl. 260—257)

This invention relates to a process for the production of vinyl compounds which have an unsubstituted vinyl group attached to a quaternary carbon atom, by reaction of a hydrogen atom on the tertiary carbon atoms which is still reactive, with acetylene in the presence of catalysts which contain compounds of the metals of the second sub-group of the periodic system.

It is already known that compounds which bear an unsubstituted vinyl group on a quaternary carbon atom cannot be prepared by the methods of operation usual for their homologues (cf. Cope, Hartung, Hancock and Crossley, J. Am. Chem. Soc. 62, 314 (1940). Therefore a very troublesome multi-stage synthesis is necessary for their production (cf. Heyl and Cope, J. Am. Chem. Soc. 65, 669 (1943)).

We have now found that compounds which bear an unsubstituted vinyl group on a quaternary carbon atom are obtained by reacting with acetylene in the presence of a catalyst a compound of the general formula

in which X' represents an acyl, carboxyalkyl, carboxyaryl, carbonamide or nitrile radical, X" an acyl, carboxyalkyl, carboxyaryl, carbonamide, nitrile or aromatic radical, and R an alkyl, cycloalkyl, alkenyl, aryl, aralkyl or heterocyclic radical, and in which X' and X" may form a carbocyclic or heterocyclic ring with each other or with R.

Among the alkyl, alkenyl, acyl and carboxyalkyl radicals specified as substituents those are preferred with a small number of carbon atoms, especially 1 to 6 carbon atoms.

Compounds of the type specified are for example the known beta-diketones and alpha-arylcarbonyl compounds, and also beta-ketoacids, beta-carboxylic acids, alpha-arylfatty acids and the functional derivatives of these acids provided the R therein has the above significance and does not represent hydrogen.

As examples of such compounds there may be mentioned 3-methylpentanedione-(2.4), butylmalonic ester, (phenylethyl)-malonic ester, alpha-cyclohexylacetoacetic ester, amylcyanoacetic ester. Compounds in which the radicals X' and X" are closed to a carbocyclic or a heterocyclic ring are for example 5-phenyl-barbituric acid, 2-propylcyclohexanedione-(1.3), 2-butylindanedione-(1.3), 1-phenyl-tetralone-(2), 4-ethyl-3.5-diketopyrazolidine, 3-methyl-2-oxocumarane. As examples of compounds in which X' or X" is closed with R to a carbocyclic or heterocyclic ring, there may be mentioned 2-acetyl-cyclohexanone, 2-cyano-cyclohexanone, cyclopentanone-2-carboxylic acid ester, tetrahydropyrone-(2)-3-carboxylic acid ester.

Those compounds of this class are of special importance which are derived from malonic acid and barbituric acid.

The reaction of the said compounds with acetylene is effected at temperatures preferably between 50° and 300° C., advantageously 140° and 200° C., in the presence of catalysts.

As catalysts there are suitable quite generally the compounds of the metals of the second sub-group of the periodic system, for example the carbonates, halides, cyanides, rhodanides or complex compounds of these metals. Especially suitable are those compounds of the metals which are soluble in the reaction mixture, as for example the salts of those metals with organic acids, as for example aliphatic monocarboxylic acids from 1 to 20 carbon atoms, aliphatic dicarboxylic acids, alicyclic and aromatic acids. Commonly used are zinc stearate, zinc palmitate, zinc naphthenate, cadmium acetate, cadmium benzoate, cadmium naphthenate, mercury acetate and mercury butyrate. The catalysts may however be used in the form of a suspension, for example in the initial material or in a solvent.

The reaction with acetylene can be carried out at normal pressure but it is advantageous to allow the acetylene to act under increased pressure.

For reasons of safety, the acetylene is introduced into the reaction vessel in admixture with inert gases so that it is diluted to below the explosion limits with inert gases, for example with nitrogen. With an acetylene content of 20 to 25%, such mixtures can be handled without danger even at high pressures, for example up to 300 atmospheres. Usually, however, the process is carried out at lower pressures, for example 5 to 50 atmospheres, at which the ignitability limits lie considerably higher.

One embodiment of the process consists in forcing 5 to 10 atmospheres of nitrogen into a pressure vessel, for example an autoclave or a rolling or shaking bomb, in which have been placed the initial materials and the catalyst. Then the reaction vessel is heated to the necessary reaction temperature so that a pressure of 10 to 12 atmospheres is set up and then acetylene is forced in to a total pressure of 25 atmospheres. The acetylene absorbed by the reaction mixture is replaced continuously or periodically.

The compounds may be used in liquid or solid state, if desired together with solvents or diluents.

In the case of substances which are solid at the reaction temperature it is preferable to use them dissolved or suspended in a solvent or diluent. The substances which are liquid at the reaction temperature may be used without any dilution. Suitable solvents or diluents are substances which are stable under the reaction conditions and do not react with the substances to be reacted, for example aliphatic and aromatic hydrocarbons, alcohols, ethers and N-persubstituted acid amides.

If any of the above-mentioned compounds contains a further vinylizable group of the same or different kind, this may also be vinylized under the reaction conditions. Such compounds are for example 5-alkyl- and aryl-barbituric acids in which both nitrogen atoms can be completely or partly vinylized.

By the process according to this invention, the said compounds, which hitherto had to be prepared by troublesome methods, can be obtained in a simple manner with good yields.

The vinyl compounds of barbituric acid may be used as soporifics. The malonic and cyanoacetic ester derivatives are intermediate products in the synthesis of soporifics.

The following examples will further illustrate this invention but the invention is not restricted to these examples. The parts specified in the examples are parts by weight.

Example 1

730 parts of butylmalonic acid diethyl ester and 30 parts of zinc stearate are treated in a pressure vessel at 150°

C. with a mixture of acetylene and nitrogen in the ratio 1:1 under a pressure of 25 excess atmospheres. The acetylene used up is replaced from time to time by forcing in fresh acetylene. After the point has been reached at which no further acetylene is being consumed, the autoclave is cooled, released from pressure and the reaction mixture is filtered and fractionally distilled. 630 parts of butyl-vinyl-malonic acid diethyl ester of the boiling point 138° to 139° C. at 21 Torr are obtained.

By saponification and decarboxylation there is obtained therefrom alpha-butylcrotonic acid of the boiling point 132° to 134° C. at 20 Torr.

*Example 2*

350 parts of alpha-cyanocaproic acid ethyl ester and 9 parts of zinc naphthenate are treated in a pressure vessel at 180° C. with acetylene under a pressure of 25 atmospheres until no further absorption takes place. The mixture is distilled in vacuo. 320 parts of alpha-cyano-alpha-vinyl-caproic acid ethyl ester of the boiling point 127° C. at 20 Torr are obtained.

*Example 3*

8 parts of zinc stearate are added to 230 parts of cyclopentanone-(1)-carboxylic-acid-(2)-ethyl ester and treated with acetylene in an autoclave at 150° C. and 25 atmospheres until no further absorption takes place. The cooled reaction mixture is filtered off and distilled. 175 parts of 2-vinylcyclopentanone-(1)-carboxylic-acid-(2) ethyl ester of the boiling point 125° to 126° C. at 20 Torr are obtained.

*Example 4*

150 parts of 3-methylpentanedione-(2.4) and 5 parts of cadmium acetate are treated in an autoclave with acetylene at 170° C. and 25 atmospheres until no further absorption takes place. The reaction mixture is filtered and fractionally distilled. 23 parts of initial material are recovered and 80 parts of 3-methyl-3-vinyl-pentane-dione-(2.4) of the boiling point 78° to 80° C. at 16 Torr are obtained.

*Example 5*

70 parts of 5-butylbarbituric acid, 60 parts of N-methylpyrrolidone and 3 parts of zinc stearate are treated in an autoclave with acetylene at 180° C. and 25 atmospheres until no further absorption takes place. The cooled reaction mixture is introduced into dilute caustic soda solution and then filtered off from insoluble impurities. The filtrate is acidified with acetic acid, the oil which separates is taken up in ether and distilled in vacuo after drying. 40 parts are obtained which pass over between 150° and 190° C. at a pressure of 1 Torr. The highly viscous distillate is dissolved in a boiling mixture of cyclohexane and benzene. Upon cooling, 30 parts of 5-butyl-3-vinylbarbituric acid of the melting point 84° C. crystallize out. The oily fraction remaining in the mother liquor can likewise be converted into 5-butyl-5-vinyl-barbituric acid by boiling with dilute hydrochloric acid, acetaldehyde thereby being driven off. Another 20 parts of the end product are obtained.

*Example 6*

A mixture of 370 parts of phenylmalonic acid diethyl ester and 12 parts of zinc stearate is treated in an autoclave at 150° C. with a mixture of acetylene and nitrogen in the ratio 1:1 under a pressure of 25 excess atmospheres, and the acetylene used up is replaced by forcing in fresh acetylene. When no further absorption takes place, the autoclave is cooled and decompressed. The contents are distilled under reduced pressure. 380 parts of phenylvinyl malonic acid diethyl ester of the boiling point 126° to 126.5° C. at 0.9 Torr are obtained.

*Example 7*

A mixture of 108 parts of cyclo-octylmalonic acid diethyl ester and 5 parts of zinc stearate is treated in an autoclave at 180° C. with a mixture of acetylene and nitrogen in the ratio 1:1 under a pressure of 25 excess atmospheres, and the acetylene used is continuously replaced by forcing in fresh acetylene. When no further absorption takes place, the autoclave is cooled and decompressed. The contents are distilled under reduced pressure. 105 parts of cyclo-octyl-vinyl-malonic acid diethyl ester of the boiling point 133° C. at 0.6 Torr are obtained.

*Example 8*

71 parts of phenylmalonic diethyl ester and 4 parts of mercury acetate are treated in an autoclave with a mixture of acetylene and nitrogen in the ratio 1:1 under a pressure of 25 excess atmospheres at a temperature of 180° C. to the point at which no further acetylene is being consumed. The reaction mixture is distilled and 70 parts of phenylvinylmalonic acid diethyl ester of the boiling point 122° C. are obtained.

*Example 9*

100 parts of 2-methyl-pentane-1.1-dicarbonic acid diethyl ester and 5 parts of zinc palmitate are treated with a mixture of acetylene and nitrogen in the ratio 1 : 1 under a pressure of 25 excess atmospheres in an autoclave at 160° C. After the point has been reached at which no further acetylene is being consumed the autoclave is cooled, released from pressure and the reaction mixture is distilled fractionally. 103 parts of 4-methyl-heptene-(6)-5.5-dicarbonic acid diethyl ester of the boiling point 143° to 145° C. at 18 Torr are obtained.

*Example 10*

100 parts of 2-methyl-pentane-1.1-dicarbonic acid diethyl ester and 5 parts of cadmium benzoate are treated with acetylene under pressure as described in Example 9. 95 parts of 4-methyl-heptene-(6)-5.5-dicarbonic acid diethyl ester are obtained.

*Example 11*

1000 parts of hexene-(1)-6.6-dicarbonic acid diethyl ester and 50 parts of zinc stearate are treated with a mixture of acetylene and nitrogen in the ratio 1:1 under pressure of 25 excess atmospheres in a pressure vessel at a temperature of 160° C. The acetylene used up is replaced from time to time by forcing in fresh acetylene. After the point has been reached at which no further acetylene is being consumed, the autoclave is cooled, released from pressure and the reaction mixture is fractionally distilled. 1023 parts of octadiene-(1.7)-6.6-dicarbonic acid diethyl ester of the boiling point 153° to 154° C. at 20 Torr are obtained.

*Example 12*

100 parts of hexene-(1.1)-6.6-dicarbonic acid diethyl ester and 5 parts of mercury butyrate are treated with acetylene as described in Example 11 at 180° C. 93 parts of octadiene-(1.7)-6.6-dicarbonic acid diethyl ester are obtained.

*Example 13*

A mixture of 50 parts of 5-(α-methyl-butyl)-barbituric acid, 50 parts of N-methyl pyrrolidone and 3 parts of zinc stearate are treated with a mixture of acetylene and nitrogen in the ratio of 1:1 under a pressure of 25 excess atmospheres at a temperature of 200° C. until no further acetylene absorption takes place. The reaction mixture is worked up as described in Example 5. 35 parts of 5-vinyl-5-(α-methyl-butyl)-barbituric acid of a boiling point 88° to 90° C. of the formula

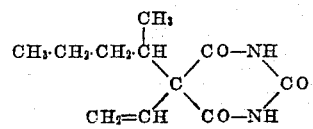

are obtained.

We claim:
1. 4-methyl-heptene-(6)-5.5-dicarbonic acid diethyl ester.
2. Octadiene-(1.7)-6.6-dicarbonic acid diethyl ester.
3. Vinyl phenyl malonic acid diethyl ester.
4. Vinyl cyclooctyl malonic acid diethyl ester.
5. 5-vinyl-5-(α-methyl-butyl)-barbituric acid.
6. A process for the production of vinyl compounds which have a vinyl group on a quaternary carbon which comprises reacting at 50–300° C., in the presence of a salt of a metal selected from the group consisting of cadmium, zinc and mercury as the catalyst, acetylene and a compound selected from the group consisting of

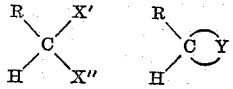

and

wherein R is selected from the group consisting of phenyl, phenyl-substituted lower alkyl, cyclohexyl, cyclooctyl, and alkyl and alkenyl having 1–6 carbons, X' is selected from the group consisting of —CO—R', —COOR' and —CN wherein R' is an alkyl group of 1–5 carbons, X" is selected from the group consisting of —CO—R", —COOR", CN and phenyl wherein R" is an alkyl group of 1–5 carbons, Y is a bivalent radical selected from the group consisting of

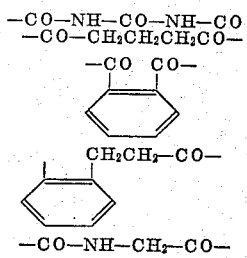

and

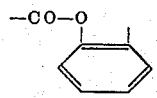

and Z is selected from the group consisting of

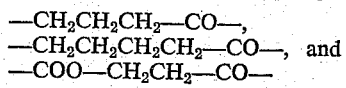

7. A process as claimed in claim 6 carried out under a pressure of 5–50 atmospheres.
8. A process for the production of vinyl barbituric acid compounds with the vinyl group on a quaternary carbon which comprises reacting with acetylene at 50–300° C. a barbituric acid of the formula

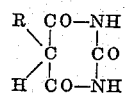

wherein R is an alkyl group of 1–6 carbons in the presence of a salt of a metal selected from the group consisting of cadmium, zinc and mercury as the catalyst.
9. A process for the production of vinyl barbituric acid compounds with the vinyl group on a quaternary carbon which comprises reacting with acetylene at 50–300° C. a barbituric acid of the formula

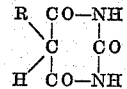

wherein R is phenyl in the presence of a salt of a metal selected from the group consisting of cadmium, zinc and mercury as the catalyst.
10. A process for the production of vinyl malonic acid esters with the vinyl group on a quaternary carbon which comprises reacting with acetylene at 50–300° C. a malonic acid ester of the formula

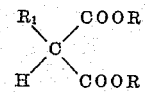

wherein R is an alkyl group of 1–5 carbons and $R_1$ is an alkyl group of 1–6 carbons in the presence of a salt of a metal selected from the group consisting of cadmium, zinc and mercury as the catalyst.
11. A process for the production of vinyl malonic acid esters with the vinyl group on a quaternary carbon which comprises reacting with acetylene at 50–300° C. a malonic acid ester of the formula

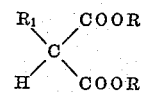

wherein R is phenyl and $R_1$ is an alkyl group of 1–6 carbons in the presence of a salt of a metal selected from the group consisting of cadmium, zinc and mercury as the catalyst.

References Cited in the file of this patent
UNITED STATES PATENTS 2,741,631    Sauer _____ Apr. 10, 1956
2,868,690    Martin _____ Jan. 13, 1959

OTHER REFERENCES

Heyl et al.: Jour. Amer. Chem. Soc., vol. 65, page 673 (1943).
Hackh's Chemical Dictionary, p. 18, third edition (1944).
Reppe: Acetylene Chemistry, P.B. Report 18852–S, pages 68–69 (1949).
Jones et al.: Jour. Chem. Soc. (London), pages 3490–3492, 1954.